April 30, 1968 P. L. PETERSCHMIDT 3,380,203
MODULAR FREE-SPAN CURVILINEAR STRUCTURES
Filed Nov. 2, 1964 2 Sheets-Sheet 1
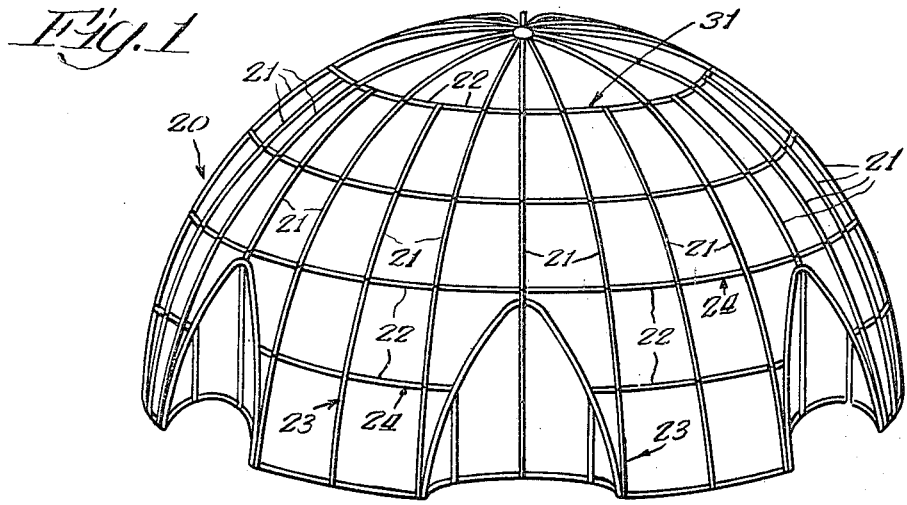
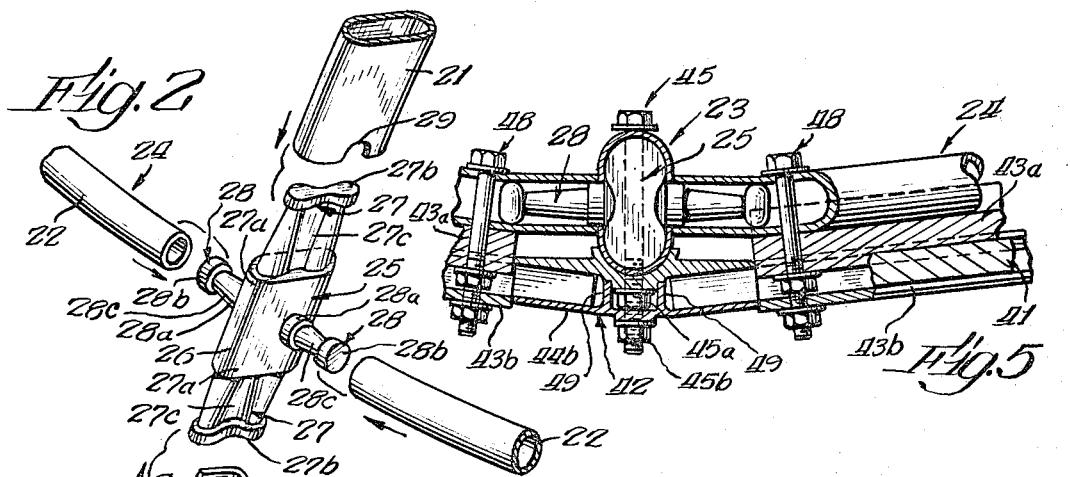
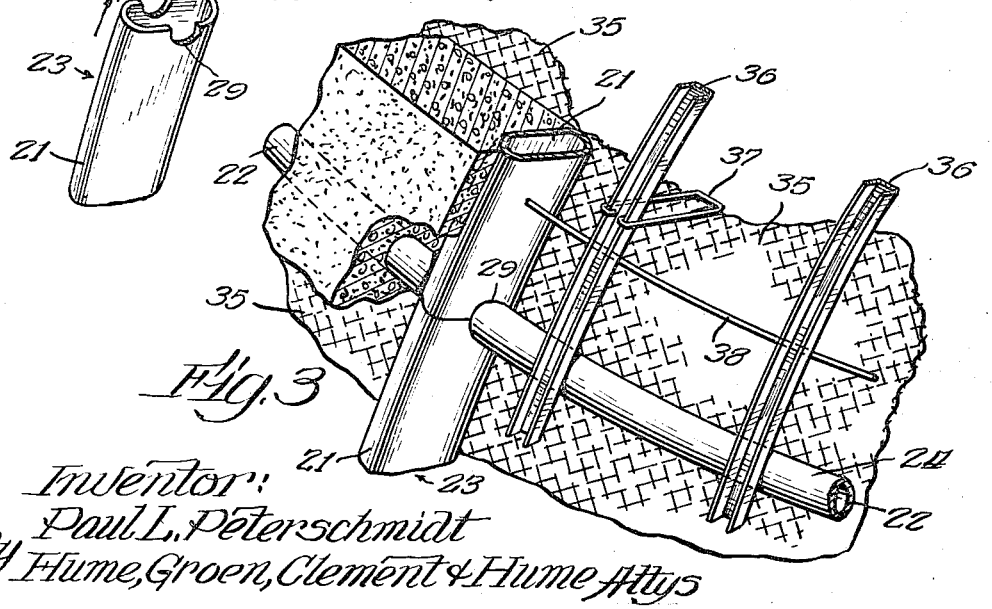
Inventor:
Paul L. Peterschmidt
By Hume, Groen, Clement & Hume Attys April 30, 1968     P. L. PETERSCHMIDT     3,380,203
MODULAR FREE-SPAN CURVILINEAR STRUCTURES
Filed Nov. 2, 1964     2 Sheets-Sheet 2
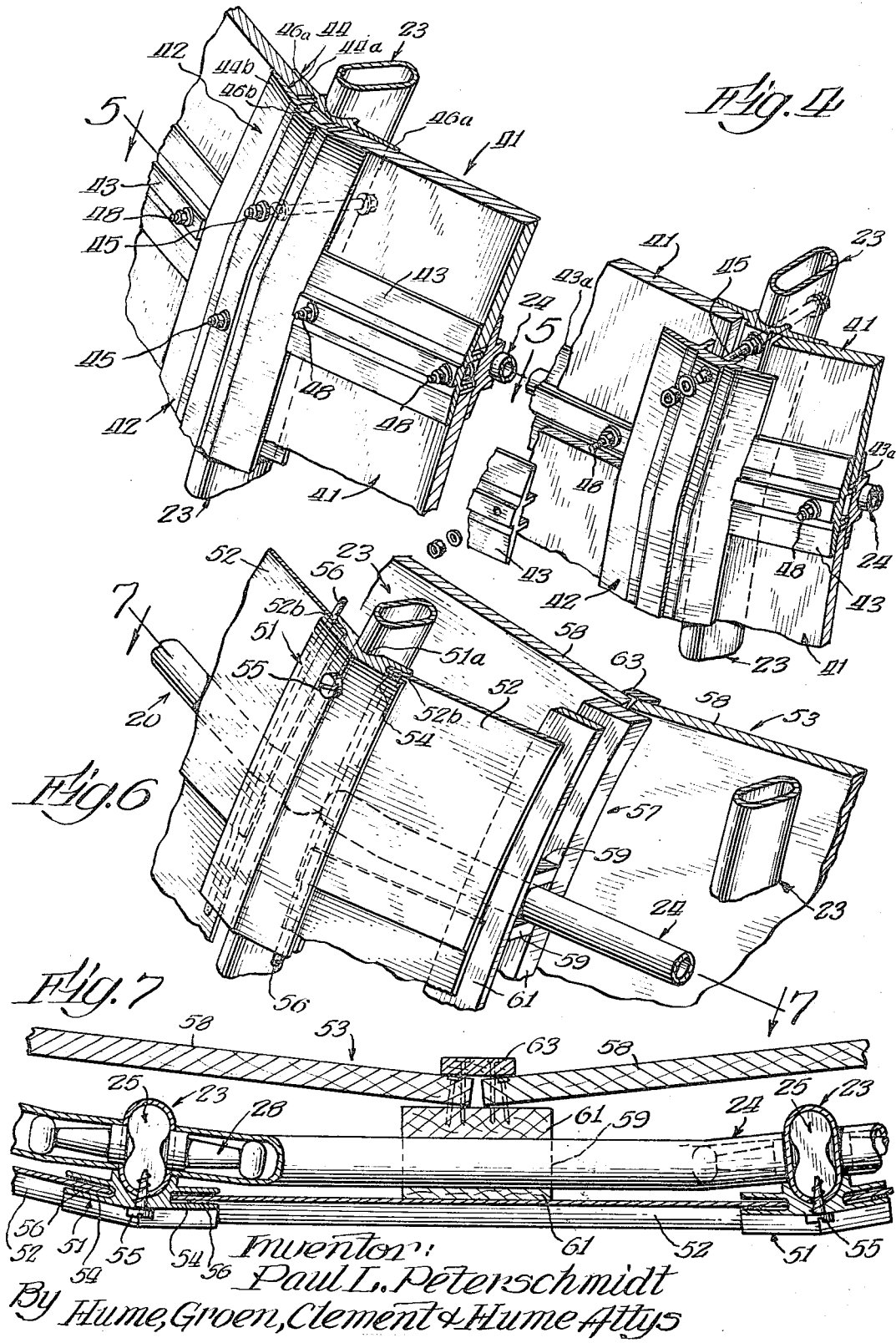
Inventor:
Paul L. Peterschmidt
By Hume, Groen, Clement & Hume Attys United States Patent Office 3,380,203
Patented Apr. 30, 1968

3,380,203
MODULAR FREE-SPAN CURVILINEAR
STRUCTURES
Paul L. Peterschmidt, Deerfield, Ill., assignor to Diversification Development Inc., Chicago, Ill., a corporation of Illinois
Filed Nov. 2, 1964, Ser. No. 408,145
2 Claims. (Cl. 52—81)

The present invention relates to free-span curvilinear structures and more particularly to modular structures of this type.

Curvilinear surface construction (e.g. domes and arch structures) makes possible the economic utilization of materials of construction by reducing the area of the exterior surface while at the same time yielding comparatively large enclosed volumes. Such structures can span great distances without the need for interior supports, can protectively enclose large volumes of space, and have numerous other advantages. However, one of the main reasons why more curvilinear structures have not been employed in modern day construction is that the expense of fabricating the curvilinear surfaces, and particularly dome structures, has outweighed their advantages. That is, the construction industry has preferred to work with generally square and flat building modules which have previously proven to be more readily adapted to a modular form of construction.

Tubular free-span structural systems now available typically do not generate or maintain true columnar loading, in that the cross-sectional modulus is frequently altered at the points of connection. Further, the complex geometry of certain dome designs requires expensive panels of compound curvature, and structures embodying such designs cannot be easily altered as to diameter and height. Moreover, it has not proven economically feasible to utilize the various poured concretes and other plastic forming materials in the fabrication of curvilinear structures due to the necessity of employing elaborate forms and/or other extensive temporary supports for confining the material until it has set. Sprayed concrete and other materials have been employed in the fabrication of curvilinear and free form structures, but various disadvantages limit the use of these materials (e.g. relatively unpredictable structural strength, costly equipment and the special skills required).

It is an object of the present invention to provide improved, relatively low cost yet fully load-bearing curvilinear structures that can be readily constructed from a variety of materials.

An additional object of the invention is to provide self-supporting curvilinear structures that can be rapidly and easily constructed using modular tubular components.

Still another object of the invention is to provide selectively enclosed free-span curvilinear structures formed of modular tubular framework components that readily accommodate a variety of enclosing media without necessitating the use of elaborate or expensive forming and/or attaching means.

Other objects and advantages of the present invention will become apparent from the following description, particularly when considered in conjunction with the accompanying drawings wherein:

FIGURE 1 is a perspective view of a load-bearing modular framework utilized in the construction of free-span curvilinear structures embodying the features of the present invention;

FIGURE 2 is an enlarged exploded view of a preferred type of joint element employed in the modular framework depicted in FIGURE 1;

FIGURE 3 is an enlarged fragmentary perspective view of a segment of the framework structure depicted in FIGURE 1 when utilizing a reinforced poured concrete enclosure means;

FIGURE 4 is an enlarged fragmentary perspective view of a segment of the framework structure depicted in FIGURE 1 when utilizing a paneled enclosure means in the form of relatively thick secured-in-place panel members;

FIGURE 5 is a cross-sectional view taken generally along the line 5—5 in FIGURE 4;

FIGURE 6 is an enlarged fragmentary perspective view of a segment of the framework depicted in FIGURE 1 when utilizing an outer slid-in-place paneled enclosure means and an inner paneled wall defining means; and FIGURE 7 is a cross-sectional view taken generally along the line 6—6 in FIGURE 6.

The present invention is directed toward the fabrication of modular, self-supporting curvilinear structures having a fully load-bearing, curvilinear framework formed by a plurality of tubular compression members of a first cross-sectional dimension and a plurality of tubular reinforcing members of a second cross-sectional dimension. A plurality of joint elements are utilized to secure the reinforcing members to the compression members and thereby complete the framework. An enclosed structure is completed by suitable enclosure means in the form of a poured concrete layer or suitable paneled covering. This type of structure can be readily fabricated without requiring the use of specially skilled labor, special equipment, and/or numerous temporary supports and forms for the enclosing medium.

Referring in detail to the drawings, each of the three illustrated embodiments of the invention incorporates a curvilinear tubular framework 20 including a plurality of joined modular components. More particularly, the framework 20 is formed by a plurality of suitably joined tubular load-bearing compression members 21 and tubular reinforcing members 22 that are adapted to receive a suitable enclosure means (e.g., in the form of a poured concrete layer or paneled covering). The members 21 and 22 are preferably formed from aluminum, steel, magnesium, Fiberglas or other suitable high strength tubular material that is pre-cut and pre-formed to facilitate the rapid and efficient fabrication of the framework 20. That is, the members are preferably cut in preselected length and bent to complement the configuration of a given section of the framework. To enhance the strength and rigidity of these members for a given structural application, a flattened cylindrical, oval, or elliptic form of tubular material is employed, atlhough round tubular components can also be utilized.

The dome-like framework shown in FIG. 1 preferably is formed by a plurality of joined, generally arcuate load-bearing columns 23 and reinforcing rings 24. The columns 23 and reinforcing rings 24 are constructed from a plurality of interconnected framework defining members 21 and 22, respectively. In this connection, the integral joining of the columns 23 to the rings 24 as well as the formulation of these components from the tubular compression members 21 and tubular reinforcing members 22 is preferably effected by a plurality of joint elements 25 (FIG. 2).

As shown, each joint element 25 is formed with a base portion 26. This base portion is comprised essentially of the joined root segments 27a of a pair of pin members 27. Another pair of root segments 28a of a pair of pin members 28 extends from oppositely disposed surfaces of the base portion 26 so that the pin members 27 and 28 are positioned generally at ninety degree angles one relative to the other.

The pin members 27 and 28 are shaped to slidably fit within the hollow ends of the tubular compression members 21 and reinforcing members 22, respectively. In this connection, the joint elements 25 are preferably generally similar to those disclosed and claimed in U.S. Patent No. 3,155,405 in that the root segments 27a and 28a of the pin members are joined to outer enlarged and rounded fitting portions 27b and 28b by intermediate portions 27c and 28c of reduced cross-section. However, the joint elements preferably utilized in the framework structure 20 differ from those disclosed in this patent because the pin members 27 have somewhat of a "figure eight" configuration. That is, the maximum amount of the material utilized to form the pin members 27 is located in the plane of the maximum dimension and near the outermost edges of these members. Consequently, the pin members 27, which are designed to mate with the hollow ends of the compression members 21 in the formation of the load-bearing columns 23, are structurally comparable to an I-beam and have improved resistance to bending in one plane.

Due to the reduced dimensions of the intermediate portions 27c and 28c of the pin members, the tubular compression and reinforcing members can be angularly disposed with respect to the joint elements 25 thereby readily facilitating both the formation and joining of the load-bearing columns 23a and reinforcing rings 24. However, after these elements have been assembled and after the hollow ends of the compression and reinforcing members have been fitted over the respective root portions 27a and 28a, each such joined assembly becomes a solid load-bearing unit.

As shown, the root portions 27a and 28a are preferably slightly tapered to facilitate providing a relatively tight friction fit with the hollow ends of the tubular members 21 and 22. Moreover, the ends of the compression members 21 are preferably formed with cut-out portions or notches 29 that are large enough to receive the ends of the reinforcing members 22 thereby facilitating a fully abutted assembly as shown, for example, in FIG. 3. As a result of this construction, each joint element 25 in a completed framework is completely enclosed within the tubular framework defining members thereby providing a smooth surface configuration and curvilinear loading without discontinuity at the joints. Because the connection of the joint elements with the tubular members 21 and 22 is external rather than internal, the load-bearing characteristics of the framework 20 can be readily varied merely by employing tubular members of differing wall thicknesses and/or cross-sectional configuration.

The joint elements 25 employed in the framework 20 can be cast or similarly formed from steel, aluminum, and other materials of suitable strength. Moreover, rather than being constructed as generally disclosed and claimed in Patent No. 3,155,405, the pin members of the joint elements 25 can be uniformly tapered elements which are connected to the end portions of the members 21 and 22 by suitable fasteners after being assembled therewith. In this latter connection, such tapered pin members can be split elements that are selectively expanded in response to the passage of a screw or the like through apertured portions of the ends of the tubular elements and through aligned threaded portions of the pin members.

To construct the framework 20, as shown in FIG. 1, the above-described interconnected assemblies are employed in repeated modular fashion. More particularly, construction is started by forming a reinforced crown ring 31 from a plurality of the tubular reinforcing members 22. This crown ring is then preferably placed around and supported by a vertical support member (not shown) that is located at the center of the construction site. The support member can be a vertical pole constructed for this purpose, the boom of a lifting crane or the like. Through the use of the support member, the crown ring 31 is raised a few feet off the ground by conventional hoisting means utilized with the support member (e.g., a cable and pulley arrangement).

As the crown ring 31 is raised, the projecting pin portions of compression members 21 used in the formation of this ring are joined to the elements 25. The free ends of these compression members are in turn fitted with other joint elements 25 and tubular reinforcing members 22 are linked to these compression members by the added joint elements to form additional horizontal reinforcing rings 24.

It will be appreciated that the entire framework 20 is constructed in modular fashion simply by repeating these construction steps (i.e., successively raising the partially completed framework, adding additional tubular members, and then raising the structure again).

Since the tubular members of the framework 20 generally have varying lengths and may also vary in other dimensional characteristics, each such tubular framework member is preferably marked with readily visible indicia subsequent to the forming of the members. This marking indicates the proper location for each such identified framework member in the completed structure and greatly facilitates the rapid fabrication thereof. That is, these markings and simple directions allow the proper tubular compression member 21 to be selected and sequentially joined to the proper joint element 25.

Through the use of the joint elements 25 and the preformed members 21 and 22, a framework 20, such as that shown in FIG. 1, can be fabricated in a relatively short period of time. Although in certain instances it may be desirable to utilize locking means to positively link the joint elements to the hollow ends of the tubular compression and reinforcing members, the construction of the framework nevertheless requires only a minimum number of joining and fastening operations. Moreover, through the use of suitable support means and successive steps of hoisting the partially completed structure, as outlined above, the entire framework can be fabricated by workmen at ground level which is a distinct advantage. Finally, it will be appreciated by those skilled in the art that the completed framework structure, unlike conventional curvilinear frameworks, is fully load-bearing and is characterized by high-strength columnar loading and minimum dead weight. Consequently, the framework can readily support a variety of enclosing media to complete a structure.

Three embodiments of enclosure means for the framework structure 20 are shown in FIGS. 3–6. More particularly, FIG. 3 depicts a poured concrete enclosure wherein various components that are joined to the framework 20 provide the forming for the concrete. Preferably, these components include a wire lath 35, a plurality of elongated U-shaped channel members 36, hooks 37 and reinforcing rods 38. The lath 35 which can be either a sheet or roll form of pierced metal, wire mesh screening or the like, is supported by the channel members 36 and hooks 37 and is preferably joined to the framework during the fabrication thereof.

In this latter connection, the channel members 36 are preferably initially mounted across and tied (e.g. by conventional tie wires) to the reinforcing members 22 so that they run generally parallel to the columns 23 formed by the members 21. Thereafter, the lath 35 is positioned inside of the framework 20 and at suitable intervals the wire hooks 37 are utilized to connect the lath to the channel members. In the illustrated embodiment, the wire hooks 37 have a generally U-shaped configuration with bent extremities so that the hooks can be passed through the lath and then clipped over the upstanding side portions of the channel members 36. It is desirable to select the hooks so that the lath 35 is maintained in abutting relationship with the tubular framework defining members 21 and 22 thereby insuring that the lath complements the curvature of the framework. To enhance the continuity and structural stability of the lath surface supported by the channel members and hooks, adjacent sheets or segments of the lath are preferably slightly overlapped.

It will be obvious to those skilled in the art that the number, specific size and spacing of the channel members 36 and hooks 37 will be dictated by such factors as the anticipated thickness and weight of the layer of poured concrete that is to be supported thereby, as well as by the weight of the lath itself. Moreover, it will be appreciated that the number of reinforcing rods which are tied to the channel members 36 in a conventional manner will be dictated by the desired strength of the finished layer. Although reinforcing rods are not necessarily employed in all poured concrete enclosed structures fabricated in accordance with the present invention, they have been illustrated in the accompanying drawing as representing a typical structural unit. Similarly, various other channel member and fastener arrangements can be utilized to mount the lath on the framework 20, the principal considerations being maintaining it in fixed relation with respect to the framework and mounting it so that this forming structure for the concrete complements the configuration of the framework irrespective of its configuration.

Upon completing the assembly of a framework with the associated lathwork as described above, this assembly is then ready to receive a poured concrete layer. Because of the load-bearing characteristics of this structure, it readily supports heavy aggregate concrete without requiring additional external supports even while the concrete is in a fully plastic state. In addition, for typical low-slump concretes, the lath 35 serves as the only necessary form and additional exterior forms are not necessary. Consequently, the concrete is applied to the framework structure by pouring it directly onto the lath and thereafter spreading it in the usual manner.

The entire layer of concrete for the structure 20 can be poured as a monolithic unit rather than pouring one section at a time and waiting for that section to set. This not only enhances the structural stability of the unit but also enables large structures to be covered within a relatively short period of time. Because the framework is self-supporting and need not depend upon the strength of the poured layer of concrete, the concrete may be one of the recently developed light insulating type concretes which have little inherent strength. Whether utilizing a lightweight insulating type concrete or a heavy aggregate high-strength concrete to form the enclosing layer for the structure, work may be commenced inside the structure prior to and during the time the concrete is poured and is setting because no internal supports or forms are necessary due to the characteristics of the framework.

From the foregoing it will be appreciated that the structure 20 performs dual functions when designed to receive a poured concrete enclosing layer. That is, the framework serves as the supporting and forming means for the poured concrete. When the concrete has set and the framework is encapsulated within a monolithic shield formed by the concrete, the framework serves additionally as an integral reinforcing grid for the concrete layer adding great rigidity and tensile strength to the completed unit. Obviously, the combined strength of the completed unit is substantially greater than the strength of either the tubular framework or of a concrete layer standing alone.

It will be appreciated that for a given application abutted wooden forms could be secured to the outside of a completed framework structure and concrete poured in place onto such a forming arrangement, although typically such forms are totally unnecessary as outlined above.

In FIGS. 4 and 5, the enclosure means for the framework structure 20 is comprised of a plurality of panel members 41, panel mounting accessories 42 and panel joining and sealing members 43. More particularly, this embodiment of the invention employs relatively thick panel members 41 that are cut to correspond to the configuration of the open framework sections defined by the intersecting load-bearing columns 23 and reinforcing rings 24. Each of the panels 41 is secured to the framework 20 and joined in abutting relationship with the adjacent panels by means of the mounting accessories 42 and the joining and sealing members 43.

In this connection, the mounting accessories 42 each include a two-part mounting bracket 44 and suitable fastener means 45. The two-part mounting bracket 44 is formed by a lower elongated support plate 44a and an upper securing or cover plate 44b, between which the lateral edge portions of the panels 41 are positioned and secured as hereinafter described in detail. The support plate 44a has longitudinal edge portions 46a which are adapted to receive and support the panels 41 in anticipation of the joining of the panels to the framework. The longitudinal supporting edge portions 46a are separated by a slightly raised central portion 46b. The underside of each of the support plates 44a is formed with a concave or generally U-shaped configuration to complement the rounded exterior edge surface of the corresponding load-bearing columns 23. It will be appreciated that once the support plates 44a are properly positioned on the edges of the columns 23, each such plate can be and is secured in place by means of fasteners 45 that pass through and extend beyond suitably apertured portions of both the compression members 21 and the plates. As shown, the fasteners 45 are preferably bolts having end portions threaded to receive both a first nut 45a for securing the support plates 44a to the compression members 21 and a second nut 45b for securing the cover plate 44b in its final position as hereinafter described.

In a similar manner, each of the joining and sealing members 43 is also a two-part unit including a lower support plate 43a and an upper securing or cover plate 43b. As with the plates 44a, the support plates 43a are proportioned to be joined to the reinforcing members 22, which comprise the reinforcing rings 24, by fasteners 48.

In this embodiment of the invention, the lower support plates 44a and 43a are preferably joined to the columns 23 and reinforcing rings 24, respectively, during the fabrication of the framework structure 20. That is, these plates are laid in place on the appropriate surfaces of the columns 23 and rings 24 in close abutting relationship and are secured in place by the fasteners 45 and 48. With this function completed, and either during the fabrication of the framework or after the framework has been completed, the panels 41 are located in place with the lateral, upper, and lower edge portions thereof being positioned on the supporting surfaces defined by the support plates 44a and 43a. Finally, the cover plates 44b and 43b are joined to the support plates so as to overlap the peripheral edges of the panels and maintain them in fixed relation with respect to the framework 20. Preferably, the support plates 44a are joined to the load-bearing columns 23 so that the completed brackets span the joints formed in these columns. In this way, the brackets serve the additional functions of locking the structure together and providing lift load protection.

As shown in FIG. 5, each of the cover plates 44b and 43b is preferably constructed with a pair of spacers or projections 49 that extend inwardly therefrom and that are brought into abutting relationship with the lower support plates when the cover plates are in the final fixed position. More particularly, these inwardly extending projections 49 engage the central portion 46b of the corresponding support plate. With this type of mounting arrangement for the relatively thick panels 41, the positively fixed positioning of these panels on the framework structure 20 is assured.

Those skilled in the art will understand that the panels 41 can be formed of substantially any material and can either be translucent or opaque, depending upon the use to which the structure will be put. Moreover, it will be appreciated that the brackets 44 and sealing members 43 are preferably extruded members formed of relatively low cost materials such as extruded aluminum or the like. When desired, gaskets and other forms of sealing media (e.g. grouting) can be used to effect sealing between the supported edge portions of the panels and the cover plates for the brackets and sealing members thereby insuring a leakproof structure.

Referring to the embodiment depicted in FIGS. 6 and 7, the enclosure for this structure is comprised of a plurality of panel supporting guides 51, which are secured to the load-bearing columns 23, and a number of thin panel members 52, which are slidably fitted and maintained within the guides 51. This structure differs from that illustrated in FIGS. 4 and 5 in that an interior paneled enclosure 53 is also provided on the framework 20.

As illustrated in FIG. 6, the guides 51 are thin elongated members having a concave interior surface 51a that facilitates positioning the guides on the curved outer edge of the load-bearing columns 23 so as to span the joints formed in these columns as with the brackets 44 (FIG. 4). When so positioned, the guides 51 are secured to the columns 23 by suitable fasteners 55 (e.g. screws or rivets). Each oppositely disposed longitudinal side portion of the guides 51 is formed with a panel receiving slot 52b that extends parallel to the longitudinal axis of the guide and along the entire length thereof. More particularly, each such slot 52b is proportioned to receive a lateral edge portion of one of the panels 52. In this connection, the slot defining portions of each of the guides 51 (whether the guides are made of aluminum or other similar material) are preferably somewhat flexible to facilitate positioning the panels therein. That is, to insure a continuous enclosure, the upper and lower edge portions of vertically adjacent panel members lying between pairs of the guides 51 are preferably slightly overlapped, and the slot defining portions of the guides are sufficiently flexible to allow this overlapping.

A continuous groove 54 is formed in the upper portion of each slot defining wall (FIG. 5) adjacent the outer edges of the guides 51. Each groove 54 is proportioned to receive a suitable plastic or rubber sealing strip 56 to insure the sealing of the outer enclosure. Preferably, the sealing strips 56 are positioned within the grooves 54 after a substantial number of vertically aligned and overlapped panels have been positioned.

In accordance with the present invention, the guides 51 are preferably extruded members that are pre-formed to facilitate the rapid and efficient joining thereof to the load-bearing columns 23 as the framework structure 20 is being formed. After a substantial portion of the framework 20 has been completed and with the guides secured to the load-bearing columns 23, the individual panel members are slid into final position within the guides. In this connection, the panels 52 are preferably pre-cut from Fiberglas, plywood or other suitable material to complement the varying configuration of the sections of the framework defined between adjacent panel receiving guides 51. As the placement of the panels 52 is effected, the sealing strips 56 are fitted within the grooves 54 and a continuous watertight enclosure is completed in this fashion. Not only does the sealing strip serve to render the enclosure watertight along the lateral edge portions of the panels, but it also maintains the panels in fixed relation within the guides 51.

While in certain instances it may be desirable to employ only the relatively thin, overlapped paneled outer enclosure, the embodiment illustrated in FIGS. 6 and 7 also contemplates the utilization of an interior paneled enclosure 53. As shown, the interior paneled enclosure is comprised of a plurality of vertically extending furring strip and spacer block assemblies 57 and panel members 58 that are supported by the assemblies 57 in spaced relation to the interior surface of the framework structure 20. The assemblies 57 include a plurality of pairs of spacer blocks 59 that are located on either side of each reinforcing member 22. These spacer blocks have the extremities thereof secured to furring strips 61 that are located on the interior and exterior sides of the framework 20 in parallel relation to the load-bearing columns 23.

Although a number of techniques may be employed in fabricating the interior paneled enclosure 53 in conjunction with the outer enclosure, it is generally preferable to form the furring strip and spacer block assemblies 57 prior to the positioning of the panels 52 within the panel receiving guides 51. In this connection and considering one such assembly, the furring strip 61 that is designated to be the outer furring strip is preferably initially joined to the free ends of a plurality of spacer block pairs. These spacer blocks when joined to the furring strip 61 are suitably spaced so that the spacer blocks of each spacer block pair are located in vertically aligned relationship on opposite sides of the members forming the reinforcing rings 24. After being so positioned, the assembly 57 is completed by joining the other furring strip 61 (i.e. the inner furring strip) to the various pairs of spacer blocks 59 (e.g. by nailing or stapling). When such assemblies 57 have been constructed for and joined to the entire framework structure 20, the interior panels 58 are secured in place as shown in FIG. 7. Preferably, this is accomplished by nailing the edges of adjacent panels to the edges of the innermost furring strips 61 and, when desired, an additional cover strip 63 can be utilized to mask the gap between the adjacent edge portions of the panels.

The structure of the type illustrated in FIGS. 6 and 7 utilizing both interior and exterior enclosures, with the interior enclosure preferably being in the form of paneled plywood or similar wooden wall members, can serve as a housing facility, lodge, etc. Such a structure is not only watertight and weatherproof, but also provides an attractive interior surfacing that precludes the framework structure from being seen from within the unit. In this connection, it should be understood that the paneled interior for the embodiment depicted in FIGS. 6 and 7 can also be fabricated through the use of panel supporting guides such as the guides 51 which are secured to the interior curved edge of the load-bearing columns 23 in the manner previously described.

From the foregoing, it will be appreciated that the present invention provides an improved form of enclosed curvilinear structure. Such a structure is advantageous from the standpoint that it utilizes a rigid high-strength columnar loaded framework that can be readily constructed in modular form and adapted with a variety of enclosing media. The structure can be fabricated in a minimum period of time and, irrespective of the form of enclosure means employed therewith, can be constructed without the need for specially skilled labor, special equipment and/or numerous temporary support forms for the enclosing media. Moreover, it will be appreciated that the various constructions outlined above are comprised of components fabricated from readily available and low cost standard materials of construction.

Various modifications of the modular curvilinear structures described herein might be devised by one skilled in the art without departing from the invention. For example, it will be appreciated that the relatively thick panel members shown in FIGS. 4 and 5 could be joined along the upper and lower edges thereof without requiring the use of the joining and sealing members 43. In this connection, the lower and upper edges of adjacent panels could be formed to complement one another so that they could be directly mated and thereafter sealed by any number of forms of sealing media (e.g. aluminum strips, weather-resistant fabric tapes or sealing compounds). In addition, the framework members forming the structure 20 might be selected from entirely round or square tubular components rather than having the illustrated configuration. These and other similar variations in the illustrated embodiments clearly would not constitute a departure from the invention as set forth in the accompanying claims.

What is claimed is:

1. A self-supporting, modular free-span continuously vertically curvilinear enclosure structure which comprises a plurality of curvilinear load bearing vertical tubular compression modules having a first noncircular cross-sectional dimension, a plurality of horizontal tubular compression and tension bearing reinforcing modules of a second and smaller cross-sectional dimension, connection means internal said compression modules connecting said compression modules to said reinforcing modules at load bearing joints, said connection means comprising unitary joint elements internal said compression modules having projecting figure eight-shaped end portions, said connected compression modules and reinforcing modules forming a fully self-supporting load bearing curvilinear framework, each of said compression and reinforcing modules having a length equal to the distance between adjacent load bearing joints, said compression modules being joined end to end by said connecting means to define a plurality of continuously curvilinear load bearing vertical arches, said reinforcing modules being joined end to end by said connecting means to define a plurality of tubular members extending horizontally across said structure, and surfacing means fully supported by said framework forming a substantially enclosed structure.

2. The structure of claim 1 wherein said surfacing means includes a poured concrete layer enclosing said framework, said framework independently supporting said concrete when said concrete is in a plastic state and serving as a reinforcing means for said concrete after said concrete has set.

References Cited

UNITED STATES PATENTS

| | | | |
|---|---|---|---|
| 1,254,131 | 1/1918 | Flynn | 52—495 |
| 1,408,553 | 3/1922 | Wedemann | 289—189.36 |
| 2,682,235 | 6/1954 | Fuller | 52—81 |
| 2,690,185 | 9/1954 | Pomykala | 52—80 |
| 2,925,154 | 2/1960 | Munro | 52—664 |
| 3,037,588 | 6/1962 | Causey | 52—637 |

FOREIGN PATENTS

| | | |
|---|---|---|
| 1,160,827 | 3/1958 | France. |

OTHER REFERENCES

Construction Methods, May 1942, page 56.

FRANK L. ABBOTT, *Primary Examiner.*

C. G. MUELLER, *Assistant Examiner.*